United States Patent Office 3,560,531
Patented Feb. 2, 1971

3,560,531
METALLATION WITH ALKALI METALS
Henri Marie Normant, Paris, France, assignor to Rhone-Poulenc S.A., Paris, France, a French body corporate
No Drawing. Filed Mar. 9, 1966, Ser. No. 532,840
Claims priority, application France, Mar. 12, 1965, 9,021
Int. Cl. C07c *15/16*
U.S. Cl. 260—389                  2 Claims

ABSTRACT OF THE DISCLOSURE

Compounds containing active hydrogen are metallated by contact with an alkali metal in a medium comprising hexamethylphosphoramide.

---

The present invention relates to metallation with alkali metals.

It is known that alkali metals, more particularly sodium, may be introduced into organic molecules by various methods, e.g. in substitution for hydrogen, halogen or methoxy or by addition to certain dienes. Various reagents may be employed for these metallations, e.g. the metal itself in more or less finely divided form, a metal amalgam or a hydride, amide, alkoxide or organometallic compound of the metal. However, these various methods and metallation reagents are not universal in application, and each has its advantages, its limits and its disadvantages. For example, certain metallations may be effected by the direct action of the alkali metal on a particular organic compound, optionally in the presence of certain organic compounds such as ethers. Thus, alkali metal alkoxides may be obtained by the direct action of an alkali metal on an alcohol, but while the lower alcohols react well under these conditions, the same is not the case with the higher alcohols, as with the latter, it is necessary to employ a sometimes appreciable excess of the alcohol over the quantity to be converted into the alkoxide. The direct action of an alkali metal on a compound to be metallated under the conditions useful for alcohols is not applicable with all categories of organic compounds. Thus, processes of metallation have been developed which involve the presence of compounds such as ethers, more particularly tetrahydrofuran, or the use of alkali metal solutions (e.g. solutions of sodium in liquid ammonia) or solutions of organic radicals, derived from aromatic hydrocarbons, of the type:

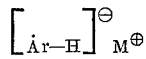                  (I)

in which ArH represents, for example, naphthalene, phenanthrene, biphenyl or stilbene, and M represents an alkali metal atom, or of ketyl metals, that is to say, compounds comprising a grouping of the formula:

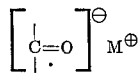                  (II)

All these processes are attended by disadvantages. In some of them, hydrogen is evolved and in others liquid ammonia must be used with, in addition, the risk of ammonolysis. With organic radical solutions and the ketyl metals, there is no evolution of hydrogen, nor is liquid ammonia used, but the presence of the electron acceptor and of its reduction derivative ($ArH_3$ or $>CHOH$) often complicates the isolation of the desired product.

A new method of metallation with alkali metal has now been discovered in which the aforesaid disadvantages are mitigated or avoided, and by which hitherto difficult metallations can be effected, thus opening up new possibilities of synthesis.

This new process consists in effecting the metallation in hexamethylphosphotriamide (hereinafter called hexametapol or HMPT) or in a diluent mixture comprising HMPT. This process may be carried out with alkali metals such as lithium, sodium or potassium, and it is applicable to a wide range of products, more particularly to the very wide range of organic compounds containing in their molecules at least one active hydrogen atom. [The term "active hydrogen atom" as used herein refers to hydrogen atoms bound to oxygen, sulphur, or nitrogen, or to carbon bound via simple bonds to —CO—, —CS—, —C=N—, —C≡N, or —$NO_2$, or to one, two or three aromatic nuclei.]

The new metallation procedure takes place without evolution of molecular hydrogen, but is accompanied by the formation of a reduction compound of HMPT. The alkali metal gradually dissolves in the HMPT to give a blue-black solution in which the alkali metal M changes to the state $M^+$, while the HMPT changes to the state of an anion radical. The compound to be metallated reacts with this solution of $(HMPT) -M^+$ to form the metallated derivative and the reduction compound of HMPT. The new process may thus be represented by the following equations:

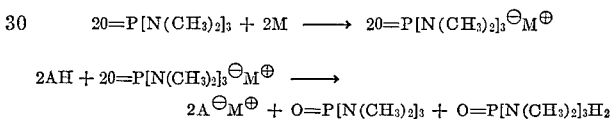

in which AH represents a molecule of the compound to be metallated. It is apparent from these equations that a half-molecule of HMPT and one gram atom of alkali metal are needed to metallate one mole of the compound AH.

The $(HMPT) -M^+$ solution is not very stable and in practice it is important that the compound to be metallated should be present in the HMPT (or the medium containing the HMPT) when the alkali metal is added, or at least that the addition of the compound to be metallated should very rapidly follow the addition of the alkali metal to the HMPT (or the medium containing the HMPT).

As previously stated, a large number of organic compounds may be metallated by the new process. In practice, provided that the operating conditions are adapted to the compound to be metallated, any compound which can be metallated by prior processes may be metallated by the new process, with the advantage that the new process can generally be carried out under much gentler conditions than the earlier processes. Moreover, with the new process, compounds can be readily metallated which hitherto could not be metallated at all or only with very great difficulty and in very poor yields.

The new process is applicable more particularly to organic compounds of the following types:

Compounds having hydrogen atoms attached to carbon atoms directly attached to at least one simple or condensed aromatic nucleus such as, for example, diphenylmethane, triphenylmethane, indene or fluorene.

Compounds having hydrogen atoms attached to carbon atoms having in the α-position an activating grouping, such as, for example, the ketonic carbonyl group of enolisable ketones of the alkanone and cycloalkanone type. The length of the hydrocarbon chain, or the size of the ring of these compounds is substantially unimportant, the only essential element being that there must be a bond

in the α-position to the carbonyl group.

Compounds having hydrogen atoms attached to carbon atoms between two groups of formula >C=O, —COOH, —COOR' (R' being, for example, an alkyl radical), or —CN. This category of compounds includes in particular enolisable β-diketones, β-ketonic acids, malonic esters, cyanacetic esters, and mono-alkyl derivatives of malonic and cyanacetic esters.

Compounds having hydrogen atoms attached to carbon atoms attached on the one hand to an activating group such as a ketonic carbonyl group, —COOH, —COOR' or —CN, and on the other hand to one or two aryl radicals having a simple or condensed nucleus. This category of compounds includes compounds of the following formulae:

Ar—CH$_2$—CO—R'

Ar—CH$_2$—CN

Ar$_2$CH—CN

Ar—CH$_2$COOR'

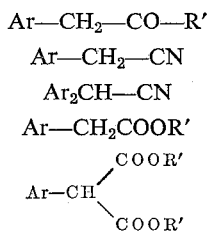

where Ar represents an aryl radical such as phenyl, naphthyl, indenyl and fluorenyl, and R' is, for example, an alkyl radical.

Alcohols such as, for example, methyl, ethyl, propyl, butyl, octyl, dodecyl, stearyl and phenylethyl alcohols, cyclopentanol, alkylcyclopentanols, cyclohexanol, alkylcyclohexanols, cyclooctanol, cyclodecanol, cyclododecanol, the alkylcyclododecanols, and the aliphatic and alicyclic polyols.

Mercaptans.—Aromatic amines such as, for example, aniline, N-alkylanilines, naphthylamines, diphenylamine and amines of the type:

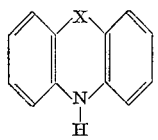

where X represents a simple valency between the two benzene nuclei, or an oxygen or sulphur atom, or a divalent hydrocarbon chain, for example of the formula:

—(CH$_2$)$_n$— where $n$ is 1, 2 or 3, or of the formula: —CH=CH—.

The organic compound to be metallated may comprise a number of hydrogen atoms replaceable by an alkali metal atom, and these hydrogen atoms may be attached to atoms of the same or different kinds, and two active hydrogen atoms may be attached to a single carbon atom (as in the case of compounds having an activated methylene group). In all cases, it is possible by the new process to replace the active hydrogen atoms entirely or partially, partial substitutions naturally taking place in order of decreasing activities, as is also the case in other metallation processes. When a number of hydrogen atoms in the same compound have similar activities, the metallation reagent generally simultaneously affects all these hydrogen atoms, as in prior processes.

As has been pointed out, one-half mole of HMPT is sufficient for each hydrogen atom replaceable by an alkali-metal atom. An excess of HMPT is therefore unnecessary in principle, and may even be harmful in some cases. However, when the metallated compound is not likely to give any side-reactions with HMPT, an excess of HMPT may be employed, and HMPT itself may be used as reaction medium. In other cases, only the theoretical quantity of HMPT is employed and the reaction mixture is diluted with a liquid organic diluent which is liquid under the operating conditions, more particularly an aprotic diluent such as a saturated aliphatic ether (more particularly diethyl ether or diisopropyl ether), a cyclic ether, e.g. tetrahydrofuran, tetrahydropyran or an alkyl derivative thereof, petroleum ether, a liquid diether of glycol or of polyalkylene glycol (more particularly the methyl, ethyl, propyl and butyl ethers of ethylene glycol, diethylene glycol and propylene glycol), a sterically hindered ketone, or tetramethylurea.

With compounds having active hydrogen atoms attached to carbon, the activation of which is due solely to the vicinity of aromatic radicals, HMPT by itself may generally be used as reaction medium. In other cases, it is generally preferable to use only the quantity of HMPT corresponding to the quantity of metal employed in the metallation.

The metallation reaction takes place well at ambient temperature (20–25° C.), but when the compound to be metallated is not likely to give any side reactions, it may be accelerated by moderate heating, for example to 60–65° C. It is thus possible to proceed with gentle heating with compounds comprising only aromatic nuclei as activating groupings. In other cases, it is preferable to operate at ambient temperature or even sometimes at a lower temperature, for example at 0° C. or even —10° to —20° C., during all or part of the metallation. Where necessary, the operation may be completed by moderate heating.

With potassium and lithium, the reaction is generally total i.e. the quantity of metal used up corresponds to the content of active hydrogen atoms in the compound to be metallated. Sodium, is, however, less reactive and generally with sodium the metallation reaction stops before all active hydrogen has been displaced. In this case, it is sufficient to eliminate the unreacted sodium and to continue the operation with the solutions thus obtained. Instead of the pure metal itself, amalgams, more particularly sodium amalgams, or alloys such as sodium/potassium alloys may be employed.

The following procedure is conveniently adopted in carrying out the new process. Into a completely dry round-bottomed flask, the appropriate quantity of HMPT, and where necessary a diluent are introduced under a dry nitrogen atmosphere. If necessary, the mixture is cooled, and the quantity of metal corresponding to the hydrogen atoms to be replaced is then added, followed by the compound to be metallated. If there is no danger of side reactions occurring, the mixture is heated. Otherwise, the metallation is allowed to proceed at ambient temperature or with moderate cooling.

The new process is not limited to the metallation of organic compounds. It is also applicable to the metallation of silicon, tin and germanium derivatives, having one or more hydrogen atoms directly attached to Si, Sn or Ge atoms.

The metallated compounds obtanied by the new process may be used in all chemical reactions involving the use of metallated derivations, for example, carbonation reactions with CO$_2$, reactions with the chlorides of organic acids, alkylation reactions, and reactions related to alkylation (e.g. hydroxyalkylation, aminoalkylation, arylation or aralkylation) using compounds of the formula:

B—X in which B represents alkyl, hydroxyalkyl, aminoalkyl, aryl or aralkyl and X represents a halogen atom (for example Cl or Br) or a group such as methanesulphonyloxy or p-toluene-sulphonyloxy. The reaction may be effected by adding the latter reactant, optionally diluted or dissolved in an organic solvent which is inert under the operating conditions, to the mixture obtained by metallation of the compound A–H. The solvents employed to dilute or dissolve the reaction mixture depend to a varying extent upon the particular case under consideration. Generally speaking the chemical literature indicates which solvents are compatible with the metallated compound and the compound to be reacted therewith in any particular case. However, saturated aliphatic ethers, the glycol ethers and petroleum ether may ordinarily be employed. Except with compounds such as acid chlorides, tetrahydrofuran or tetrahydropyran may also be employed. With alkyl and aralkyl chlorides and bromides and other compounds which do not react therewith, HMPT may be employed as diluent, and this is often advantageous. The solution of metallated compound may optionally be diluted before use. In particular, it is often advantageous to do this when the metallation takes place exclusively in HMPT and when the compound to be reacted with the metallated compound is capable of reacting with HMPT. On the other hand, when the metallation has been carried out with only the theoretical quantity of HMPT and when the compound thereafter added has substantially no action on HMPT, it may often be advantageous to add additional HMPT before the addition of the second compound, because HMPT is a good ionising solvent and favours the action of the latter compound with the metallated derivative.

In practice, the second compound may be added to the metallated compound or vice versa. The mixture may be prepared, for example at ambient temperature, followed by heating to a temperature varying in accordance with the compounds reacted. When the compounds react readily, moderate heating (60–70° C.) is sufficient. In other cases, it may be necessary to heat to higher temperatures (for example 140°–150° C.). In some cases a little cooling will be preferable, for example, to about 0° C., when the reactants are mixed. The mixture is then allowed to return gradually to ambient temperature (20–25° C.), and then heated to complete the reaction. Since HMPT and its reduction product are readily soluble in water, it is then sufficient to treat the reaction product with water to separate the HMPT and its reduced derivative from the compound formed in the reaction when the latter is insoluble in water (or may be rendered insoluble, as is often the case).

The following examples illustrate the invention.

added, and the mixture is heated at about 60–70° C. for 3 to 4 hours and then cooled and poured into iced water. The organic layer is separated and the extractions and washings are carried out by the usual techniques.

The results obtained by metallation of various compounds with Na, K or Li followed by reaction with various halogenated compounds are given in the following table.

| Compound metallated | Metal | Halogenated Compound | Compound obtained (M.P.) | Yield, percent |
|---|---|---|---|---|
| $Ph_3CH$ | K | $PhCH_2Cl$ | $Ph_3C-CH_2-Ph$, 144–145° C | 90 |
| $Ph_2CH_2$ | K | $PhCH_2Cl$ | $Ph_2CH.CH_2Ph$, 56–57° C | 66 |
| $Ph_2CH_2$ | K | $nC_4H_9I$ | $Ph_2CH.C_4H_9$, B.P. 110° C./0.1 mm. Hg | 64 |
| $Ph_2CH_2$ | K | $Br(CH_2)_4Br$ | $Ph_2CH(CH_2)_4CHPh_2$, 118° C | 87 |
| $Ph_2CH_2$ | Li | $Br(CH_2)_4Br$ | $Ph_2CH(CH_2)_4CHPh_2$, 118° C | [1] 90 |
| Fluorene | Na | $C_2H_5I$ | 9-ethyl-fluorene, B.P. 158–162° C./17 mm. Hg | [1] 73 |
| $nC_4H_9OH$ | Na | $PhCH_2Cl$ | $PhCH_2-O-C_4H_9$, B.P. 99–100° C./14 mm. Hg | [1] 77 |
| $PhNHC_2H_5$ | K | $C_2H_5I$ | $Ph-N(C_2H_5)_2$, B.P. 97° C./15 mm. Hg | 77 |

[1] Yield calculated on metal used up.
NOTE.—Ph=phenyl.

EXAMPLE 1

Into a completely dry 250 cc. round-bottomed flask connected to the atmosphere by a calcium chloride trap, and containing a dry nitrogen atmosphere are introduced 30 to 40 cc. of hexametapol then 0.1 gram atom of alkali metal (sodium, potassium or lithium). On stirring, a blue colour rapidly appears and 0.1 mol. of the compound to be metallated is then immediately added in one lot, optionally as a solution in hexametapol if the compound is solid. While the stirring is continued, the temperature of the mixture is raised to 60° C. At the end of 3–4 hours, the metal has generally completely disappeared when the alkali metal is potassium or lithium. When the metal is sodium, some sodium always remains, since the latter becomes passive after a time. Such unreacted sodium is eliminated before the addition of any fresh reagent to the sodium compound formed.

To the solution of metallated derivative thus obtained, 0.1 mol. of halogenated compound (alkyl or aralkyl halide) or 0.05 mol. of dihalogenated compound is

EXAMPLE 2

Triphenylmethane and diphenylmethane are metallated with sodium under the same conditions as described in Example 1, and the cold solutions of metallated compounds thus obtained are poured onto a mixture of solid carbon dioxide and ether in a Dewar flask. The mixture is allowed to warm up to ambient temperature and then poured into iced water. The aqueous mixture is acidified by the addition of hydrochloric acid and extracted. With triphenylmethane, triphenylacetic acid, M.P. 270° C., is thus obtained, and with diphenylmethane, diphenylacetic acid, M.P. 151° C. is obtained.

EXAMPLE 3

0.1 mol. of phenylacetic acid is metallated with 0.2 gram atom of sodium in 40 cc. of HMPT in the manner described in Example 1. Half of the sodium serves to form the salt $PhCH_2-COONa$ and the other half to metallate the $-CH_2-$ group. The solution of metallated derivative is then carbonated by the procedure described in Example 2. The reaction mixture is poured into water, acidified and extracted, and phenylmalonic acid, M.P. 170° C. with decomposition, is obtained.

EXAMPLE 4

Into an apparatus identical with that of Example 1, 30 cc. of hexametapol, 1.95 g. of potassium (0.05 gram-atom) and 12.2 g. of triphenylmethane (0.05 mol.) are introduced, and the whole is heated at 60° C. with stirring for 4 hours. After cooling, 100 cc. of petroleum ether (B.P. 35–60° C.) are added. Two layers are formed, the lower layer being red. A solution of 7.03 g. (0.05 mol.) of benzoyl chloride in 20 cc. of petroleum ether is then added in the cold with stirring, and a precipitate forms. After heating under reflux for 4 hours, followed by cooling, the reaction product is poured into iced water and acidified by the addition of aqueous hydrochloric acid solution (1:2). The crystals formed are separated, washed and dried. After concentration, a second fraction of product is obtained from the liquid organic phase. In all, 12 g. of triphenylacetophenone, M.P. 173° C. are obtained. The melting point may be raised to 179° C. by recrystallisation from ethyl acetate. The yield is 69% of theory.

EXAMPLE 5

Into an apparatus identical with that of Example 1 10 g. of hexametapol (0.055 mol.) are introduced, followed by 0.1 gram-atom of potassium and 24.4 g. of triphenylmethane (0.1 mol.) in solution in 100 cc. of diethyl ether. The whole is then heated under reflux for 2 hours. 10.4 g. (0.05 mol.) of 1,4-dibromobutane are then added in the cold with stirring and the ether is driven off. The product is heated at 60–70° C. for 4 hours, cooled and poured into iced water. After extraction by the usual techniques 8.1 g. of 1,1,1,6,6,6-hexaphenylhexane, M.P. 203° C., a yield of 60% of theory, are obtained.

EXAMPLE 6

Proceeding in the same way, replacing the diethyl ether by tetrahydrofuran, and the potassium by lithium, the same result is obtained.

EXAMPLE 6

Into an apparatus identical with that of Example 1 10 g. of hexametapol (0.055 mol.) and 25 cc. of diethyl ether are introduced. The mixture is cooled to about 0° C. and 0.1 gram-atom of potassium and 24 g. of acetophenone (0.2 mol., i.e. an excess of 100%) are added. The mixture is allowed to heat up. The mixture turns brown and a precipitate is formed. The mixture is left overnight and 12.1 g. (0.1 mol.) of allyl bromide cooled to 0° C. are added. The temperature of the mixture is allowed to return to 20° C., 50 cc. of tetrahydrofuran are added, the diethyl ether is driven off by moderate heating, and the product is then heated at 60–65° C. for 6 hours. After cooling, the whole is poured into iced water and the organic layer is separated and distilled. The following fractions are obtained: B.P. 80° C./13 mm. Hg Ph—CO—CH$_3$ recovered (11 g.), B.P. 115–120° C./13 mm. Hg PhCO—CH$_2$—CH$_2$—CH=CH$_2$ (4 g.), B.P. 130–134° C./13 mm. Hg PhCO—CH(CH$_2$—CH=CH$_2$)$_2$ (4.3 g.), and PhCO—C(CH$_2$—CH=CH$_2$)$_3$ (1.2 g.).

EXAMPLE 7

Into an apparatus identical with that of Example 1 10 g. of hexametapol (0.055 mol.), 25 cc. of tetrahydrofuran and 1.5 cc. t-butylalcohol are introduced.

The contents of the flask are cooled to about 0° C. and 0.1 gram-atom of potassium is added followed drop-by-drop with stirring by a solution of 9.8 g. (0.1 mol.) of cyclohexanone in an equal quantity of tetrahydrofuran. The mixture is allowed to return to ambient temperature (20° C.) and left overnight. It is then poured onto 0.1 mol. of allyl bromide cooled to 0° C., the mixture is allowed to return to ambient temperature and the operation is completed by heating at 65° C. for 4 hours. The whole is then poured into iced water and the organic layer is separated and distilled. The following fractions are obtained: B.P. products distilling below 85° C./17 mm. Hg 3.5 g. B.P.=86–88° C./11 mm. Hg

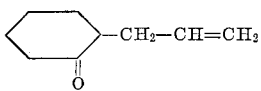

$n_D^{21}$=1.4694 3 g. B.P.=107–109° C./11 mm. Hg

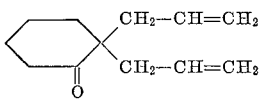

$n_D^{21}$=1.4800 4.6 g.

EXAMPLE 8

Into an apparatus identical with that of Example 1, 10 g. of hexametapol (0.055 mol.) and 50 cc. of diethyl ether are introduced. The contents of the flask are cooled to about 0° C. and 0.1 gram-atom of potassium is added followed by 16 g. (0.1 mol.) of diethyl malonate in solution in 20 cc. of diethyl ether. The whole is left overnight at ambient temperature and 0.1 mol. of allyl bromide cooled at 0° C. is then added. The reaction is completed as previously described and the whole is then poured into iced water and the extraction treatments carried out as previously described. 15 g. of diethyl monoallylmalonate, B.P.=102–103° C./10 mm. Hg. $n_D^{21}$=1.4317 are obtained with a yield of 75% of theory.

In addition a little of the diallylated compound is obtained.

EXAMPLE 9

The procedure of Example 8 is followed, the diethyl malonate being replaced by 0.1 mol. of ethyl cyanoacetate. 6.5 g. of ethyl monoallylcyanacetate B.P.=97–98° C./12 mm. Hg, $n_D^{20}$=1.4320, and 6 g. of ethyl diallylcyanacetate B.P.=111° C./12 mm. Hg, $n_D^{20}$=1.4495, are obtained.

EXAMPLE 10

Into the same apparatus as in Example 1, 10 g. of hexametapol (0.055 mol.) and 25 cc. of diethyl ether cooled at about 0° C. are introduced, 0.1 gram-atom of potassium is added, followed by 11.7 g. of phenylacetonitrile (0.1 mol.). The mixture is then allowed to return to ambient temperature (20° C.) over four hours with stirring. 12.65 g. (0.1 mol.) of benzyl chloride are added and the mixture is heated to about 60° C. After the usual separation and fractionation treatments, 3 g. of recovered PhCH$_2$Cl, 10 g. of

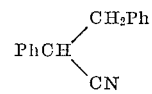

and 12 g. of PhC(CH$_2$Ph)$_2$CN are obtained.

EXAMPLE 11

Into an apparatus identical with that of Example 1, 10 g. of hexametapol (0.055 mol.), 20 cc. of diethyl ether and 0.1 gram-atom of potassium are introduced, followed by 15.23 of triphenylgermane (0.05 mol.) mixed with 20 cc. of diethyl ether. The mixture acquires a golden-yellow hue. The whole is left overnight with stirring at ambient temperature (20° C.) and then heated under reflux for 1 hour and cooled. 6.85 g. of n-butyl bromide (0.05 mol.) are added and the whole is heated under reflux for 4 hours, cooled and poured into iced water. After the usual treatments of extraction and elimination of the solvent, 16.6 g. of crude crystals are obtained, recrystallisation of which from ethyl acetate gives 10.5 g. of triphenylbutylgermane (Ph$_3$Ge—C$_4$H$_9$), M.P. 84° C., and 6 g. of a product consisting mainly of diphenyldibutylgermane produced by a side reaction.

EXAMPLE 12

Into a well-dried 100 cc. three-necked round-bottomed flask provided with a stirrer, a thermometer and a dropping funnel, 22.7 g. of HMPT and a few small pieces of potassium metal are introduced, under a nitrogen atmosphere followed, when the blue colour has sufficiently developed, by aniline. The remainder of the potassium (the total quantity introduced is 3.9 g. i.e. 0.1 gram-atom) is then added and the mixture is heated at 55–60° C. with brisk stirring for the time necessary for complete dissolution of the potassium (about 2 hours). When this has been done, 11.3 g. (0.1 mol.) of chlorobenzene are added in 20 minutes and the mixture is carefully heated to 140° C. A vigorous evolution of heat occurs. Heating is continued for 2 hours and the mixture is then cooled while still under nitrogen.

The reaction product is washed with 100 cc. of water with good stirring, and the washing liquors themselves are then extracted with 3× 50 cc. of diethyl ether. The organic solutions are then combined and the whole is washed with 4× 25 cc. of water. The washed ethereal solution is treated with a 5% aqueous HCl solution to extract the unconverted aniline and then washed with 3× 50 cc. of water, dried over sodium sulphate and filtered. The ether is evaporated and a mixture of di- and triphenylamine is thus obtained, which can be fractionated by treatment with alcohol, or by chromatography.

Three successive experiments carried out with different charges of aniline gave the following results:

| Aniline | | Chlorine recovered as potassium chloride, percent | Diphenyl-amine, gram | Triphenyl-amine, gram |
|---|---|---|---|---|
| Introduced, gram | Recovered, gram | | | |
| 10.2 | 2.3 | 83 | 1.9 | 7.6 |
| 18.6 | 5.0 | 87 | 2.9 | 6.6 |
| 37.2 | 27 | 81 | 4.8 | 4.8 |

EXAMPLE 13

Under the operating conditions described in Example 12, using the starting materials referred to in the following table, the results set out in the table are obtained:

I claim:
1. In a process for the metallation of an organic compound containing a hydrogen atom bound to oxygen, to sulphur, to nitrogen, or to carbon bound via a single bond to —CO—, —CS—, —C≡N—, C=N, or —NO$_2$, or to one, two, or three aromatic nuclei by contacting the said compound with an alkali metal, the improvement which consists in contacting the said compound with the stoichiometric quantity of the alkali metal in the presence of at least half a molecular proportion of hexamethylphosphotriamide for each gram atom of alkali metal.
2. The improvement of claim 1 in which the alkali metal is lithium, sodium, or potassium.

| Aromatic amine, g. | HMPT, g. | K, g. | Aryl chloride, g. | Chlorine recovered as KCl, percent | Product obtained, g. |
|---|---|---|---|---|---|
| Aniline: | | | | | |
| Introduced, 18.6 / Recovered, 10 | 22.7 | 3.9 | m-Dichlorobenzene, 14.7 | 82.5 | 3-chlorodiphenylamine, 9.4. |
| Introduced, 37.2 / Recovered, 26 | 22.7 | 3.9 | do | 84.5 | 3-chlorodiphenylamine, 10.3. |
| m-Toluidine: | | | | | |
| Introduced, 21.4 / Recovered, 12 | 22.7 | 3.9 | Chlorobenzene, 11.3 | 90 | 3-methyldiphenylamine, 1.9. / 3-methyltriphenylamine, 7.6. |
| Aniline: | | | | | |
| Introduced, 18.6 / Recovered, 12.6 | 22.7 | 3.9 | m-Chlorotoluene, 12.7 | 75 | 3-methyldiphenylamine, 3.4. / Impure 3,3'-dimethyltriphenylamine, 6.3. |
| Introduced, 18.6 / Recovered, 13.3 | 22.7 | 3.9 | m-Methylthiochlorobenzene, 15.9 | 81.25 | 3-methylthiodiphenylamine, 5.2. / 3,3'-di(methylthio)-triphenylamine, 2.5. |
| Aniline, introduced, 18.6 | 22.7 | 3.9 | m-Chloroanisole, 14.3 | 82 | 3-methoxydiphenylamine, 3.6. / 3,3'-di(methoxy)-triphenylamine, 6.1. |

References Cited

UNITED STATES PATENTS 3,217,050  11/1965  Schriesheim et al. ____ 260—665

OTHER REFERENCES

Eberhardt, J. Org. Chem. 29, 643–645 (1964).

Schlosser, Angewandte Chemie, International Edition, 3 (No. 5) (1964) pp. 362–365.

Norment et al. (1) Bull. Soc. Chim. France 1960, 354–358.

Cuvigny et al. (1) Bull. Soc. Chim. France 1964, 2000–2009.

Normant et al. (2) Bull. Soc. Chim. France 1965, 1561–1562.

Cuvigny et al. (2) Compt. Rend. 258, 3502–3503 (1964).

DANIEL D. HORWITZ, Primary Examiner

U.S. Cl. X.R.

260—465, 429, 576, 609, 566, 448.2, 644, 665, 668, 611, 577, 515, 243, 244, 239, 279, 590, 592, 586, 475, 465.4